(12) United States Patent
Shimazaki

(10) Patent No.: US 6,932,048 B2
(45) Date of Patent: Aug. 23, 2005

(54) COMBUSTION CONTROL DEVICE AND METHOD FOR ENGINE

(75) Inventor: Naoki Shimazaki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 29 days.

(21) Appl. No.: 10/771,683

(22) Filed: Feb. 4, 2004

(65) Prior Publication Data

US 2004/0154582 A1 Aug. 12, 2004

(30) Foreign Application Priority Data

Feb. 7, 2003 (JP) ..................................... 2003-030811

(51) Int. Cl.[7] ................................................. F02B 3/00
(52) U.S. Cl. ..................... 123/299; 123/300; 123/305
(58) Field of Search ............................... 123/295, 299, 123/300, 305, 435, 25 C

(56) References Cited

U.S. PATENT DOCUMENTS

| | | | |
|---|---|---|---|
| 6,276,334 B1 | 8/2001 | Flynn et al. | 123/435 |
| 6,508,229 B2 * | 1/2003 | Miyakubo et al. | 123/305 |
| 6,619,255 B2 * | 9/2003 | Urushihara et al. | 123/295 |
| 6,647,949 B2 * | 11/2003 | Hosokawa et al. | 123/295 |
| 2001/0052335 A1 * | 12/2001 | Miyakubo et al. | 123/305 |
| 2002/0046730 A1 * | 4/2002 | Hosokawa et al. | 123/295 |
| 2004/0154582 A1 * | 8/2004 | Shimazaki | 123/299 |

FOREIGN PATENT DOCUMENTS

| | | |
|---|---|---|
| JP | 09-112325 | 4/1997 |
| JP | 10-331690 | 12/1998 |
| JP | 11-324764 | 11/1999 |
| JP | 2000-130200 | 5/2000 |
| JP | 2000-145507 | 5/2000 |
| JP | 2001-020784 | 1/2001 |
| JP | 2001-207890 | 8/2001 |

* cited by examiner

Primary Examiner—John T. Kwon
(74) Attorney, Agent, or Firm—McCormick, Paulding & Huber LLP

(57) ABSTRACT

A combustion control device for an engine, comprises a fuel injection valve for injecting a fuel into a combustion chamber, ignition timing adjustment unit for adjusting an ignition timing of a mixture inside the combustion chamber, and control unit for controlling the fuel injection valve and the ignition timing adjustment unit. The control unit controls the fuel injection valve so as to execute at least a first injection which is conducted within the interval from an intake stroke to a compression stroke and a second injection conducted in the vicinity of a compression top dead center after the execution of the first injection, and controls the ignition timing adjustment unit so that the mixture formed by a fuel injected by the first injection and second injection and an intake air or the like is ignited after completion of the injection of the second injection.

20 Claims, 6 Drawing Sheets

COMBUSTION CONTROL DEVICE AND METHOD FOR ENGINE

CROSS REFERENCE TO RELATED APPLICATION

Applicants hereby claims foreign priority benefits under U.S.C. § 119 of Japanese Patent Application No. 2003-30811, filed Feb. 7, 2003, and the content of which is herein incorporated by reference.

BACKGROUND OF THE INVENTION

1. Field of the Invention

The present invention relates to a combustion control device and method for an engine, and more particularly to a combustion control device and method for an engine, which is capable of realizing a premix combustion that can sufficiently decrease the quantity of NOx (Nitrogen Oxides) and smoke in a wider operation region.

2. Description of the Related Art

In the conventional diesel engines, the combustion has been typically conducted by injecting fuel in the vicinity of the compression top dead center (TDC) of a piston when the temperature and pressure inside the cylinder (inside the combustion chamber) were high.

The injected fuel is mixed with the intake air, forming a mixture, this mixture is ignited, flame is formed, and the combustion is maintained by supplying subsequent injected fuel into the flame. In this combustion system, the ignition starts during fuel injection; in the present specification, this combustion system will be referred to as a normal combustion.

However, in recent years, new combustion systems have been suggested, those systems being capable of significantly reducing the quantity of NOx and smoke, without greatly degrading the fuel consumption, by setting the fuel injection timing earlier than the compression top dead center, thereby extending the ignition delay period and sufficiently enhancing the mixing of fuel and intake air (for example, Japanese Patent Applications Laid-open No. H9-112325 and 10-331690).

In those combustion systems, fuel injection is conducted within the interval from the intake stroke before the compression top dead center to the compression stroke and the ignition is started once a prescribed ignition delay period elapses after the fuel injection end. In such an injection system, the ignition delay period is long and the mixture is sufficiently leaned (rarefied) and homogenized. Therefore, local combustion temperature drops and the quantity of emitted NOx is reduced. Furthermore, smoke is also controlled because the combustion in a local air-deficient state is avoided. The combustion system in which the ignition is thus started after the fuel injection completion will be in the present specification referred to as a premix combustion.

Thus, though the premix combustion is effective in terms of improving the exhaust gas, because it can be employed only in a low-load and low-rpm range of the engine, it is presently necessary to switch to the normal combustion system in a high-load and high-rpm range. For example, the above-mentioned Japanese Patent Application Laid-open 10-331690 describes a diesel engine in which the premix combustion based on early injection is conducted during low-and medium-load operation, and the normal combustion in which fuel is injected in the vicinity of the compression top dead center is conducted during a high-load operation.

The main reason why the premix combustion cannot be employed in a high-load and high-rpm range is that the planned proper ignition cannot be ensured.

Thus, when the engine revolution speed is low, the fuel is at a high temperature and a high pressure inside the cylinder for a comparatively long time. As a result, chemical reactions easily proceed ensuring the ignition. By contrast, when the engine revolution speed is high, the fuel is at a high temperature and a high pressure inside the cylinder for a short time. As a result, a misfire easily occurs. In the case of premix combustion, because leaning and homogenization of the mixture smoothes out the temperature non-uniformity inside the cylinder, the transition to the expansion stroke can be made while a sufficient exothermic reaction has not yet been initiated in the beginning of combustion and a misfire can occur. For this reason, the misfire has been prevented by switching to the normal combustion, in which a spread occurs in the temperature distribution of the premix, in a high-rpm range.

Further, switching to the normal combustion was also made because conducting fuel injection early in the high-load range of an engine can cause severe diesel knocking.

An engine has recently been invented in which a pilot injection of a comparatively small quantity of fuel was conducted for premixing earlier than the compression top dead center and a main injection of a comparatively large quantity of fuel was conducted for the normal combustion in the vicinity of the compression top dead center (for example, Japanese Patent Applications Laid-open No 2000-145507 and 2001-207890).

With such a two-stage injection system, because the ignition is ensured by the main injection, the application in a wider operation range is possible.

However, because the fuel injected by the main injection is conducted by the normal combustion method, the quantity of emitted NOx and smoke is accordingly increased by comparison with the premix combustion based on single-stage injection.

Furthermore, the EGR (Exhaust Gas Recirculation (Recirculator)) by which exhaust gases are returned into the combustion chamber is effective for reducing the quantity of NOx, but if the EGR ratio in the normal combustion is increased, then air deficiency occurs and smoke is generated. Therefore, in the conventional two-stage injection system, it was necessary to control the EGR ratio. As a result, a certain quantity of NOx was also emitted. In this case, smoke and NOx are purified in after-treatment devices, but such a procedure increases fuel consumption and cost.

Further, even in the case of premix combustion using the above-mentioned single-stage ignition, if the EGR ratio was increased, the concentration of oxygen dropped and a misfire could even more easily occur. For this reason, a sufficient effect of reducing the emission of NOx by the EGR could not be obtained.

SUMMARY OF THE INVENTION

It is an object of the present invention to provide a fuel control apparatus and method for an engine which is capable of realizing a premix combustion that can sufficiently decrease the quantity of NOx and smoke in a wider operation region.

In order to attain the aforesaid object, the present invention provides a combustion control device for an engine, comprising a fuel injection valve for injecting a fuel into a combustion chamber, ignition timing adjustment means for adjusting an ignition timing of a mixture inside the combustion chamber, and control means for controlling the fuel injection valve and the ignition timing adjustment means, wherein the control means controls the fuel injection valve so as to execute at least a first injection within the interval from an intake stroke to a compression stroke and a second injection conducted in the vicinity of a compression top dead center after the execution of the first injection, and controls the ignition timing adjustment means so that the mixture formed by a fuel injected by the first injection and second injection and an intake air or the like is ignited after the injection of the second injection is completed.

Here, the aforesaid ignition timing adjustment means may be composed of exhaust gas recirculation system for circulating exhaust gas into the combustion chamber.

Further, the aforesaid ignition timing adjustment means may be composed of a variable compression ratio mechanism for changing a compression ratio by varying the capacity of the combustion chamber.

Further, the aforesaid ignition timing adjustment means may be composed of a variable valve timing mechanism for changing the compression ratio by varying the open-close timing of intake and exhaust valves.

The aforesaid ignition timing adjustment means may be composed of injection means for injecting a liquid such as water or alcohol into the combustion chamber.

The aforesaid ignition timing adjustment means may include a spark plug provided so as to face the inside of the combustion chamber and current conduction means for igniting the mixture inside the combustion chamber by supplying an electric current to the spark plug.

Furthermore, the control means may control the ignition timing adjustment means so that the peak of the mixture concentration frequency distribution of the mixture formed by the second ignition when the mixture present inside the combustion chamber is ignited assumes a value of two or less, as an equivalence ratio.

The control means may also determine an injection quantity and/or injection timing of the first injection so that the peak of the mixture concentration frequency distribution of the mixture formed by the first ignition when the mixture present inside the combustion chamber is ignited assumes a value of one or less, as an equivalence ratio.

Furthermore, the present invention provides a combustion control device for an engine, comprising a fuel injection valve for injecting a fuel into a combustion chamber, ignition timing adjustment means for adjusting an ignition timing of a mixture inside the combustion chamber, and control means for controlling the fuel injection valve and the ignition timing adjustment means, wherein the control means comprises as fuel injection modes at least:

a single-stage premix injection mode in which the fuel injection valve is controlled so as to execute one injection within the interval from an intake stroke to a compression stroke when an engine operation state is in a region with a low revolution speed and a low load; and a multistage premix injection mode in which the fuel injection valve is controlled so as to execute at least a first injection conducted within the interval from an intake stroke to a compression stroke and a second injection conducted in the vicinity of a compression top dead center after the execution of the first injection, and the ignition timing adjustment means is controlled so that the mixture formed by a fuel injected by the first injection and second injection and an intake air or the like is ignited after the ignition end of the second injection, when the engine operation state is in a region with a higher revolution speed and a higher load than those of the region in which the single-stage premix injection mode is executed.

Here, the control means may additionally comprise as the fuel injection mode a normal injection mode in which the fuel injection valve is controlled so as to execute at least one injection in the vicinity of the compression top dead center when the engine operation state is in a region with a load higher than that of the region in which the multistage premix injection mode is executed.

Further, the ignition timing adjustment means may comprise exhaust gas recirculation (EGR) system for circulating exhaust gas into the combustion chamber, and the control means may control the fuel injection valve so as to decrease gradually an injection quantity of the first injection of the multistage premix injection mode and to increase gradually an injection quantity of the second injection to a target injection quantity of the normal injection mode, and may control the exhaust gas recirculation system so as to decrease gradually a return ratio of the exhaust gas according to the increase in the injection quantity of the second injection when a transition is made from the multistage premix injection mode to the normal injection mode.

DESCRIPTION OF THE PREFERRED EMBODIMENTS

The preferred embodiment of the present invention will be described hereinbelow in greater detail with reference to the appended drawings.

Figure 1:
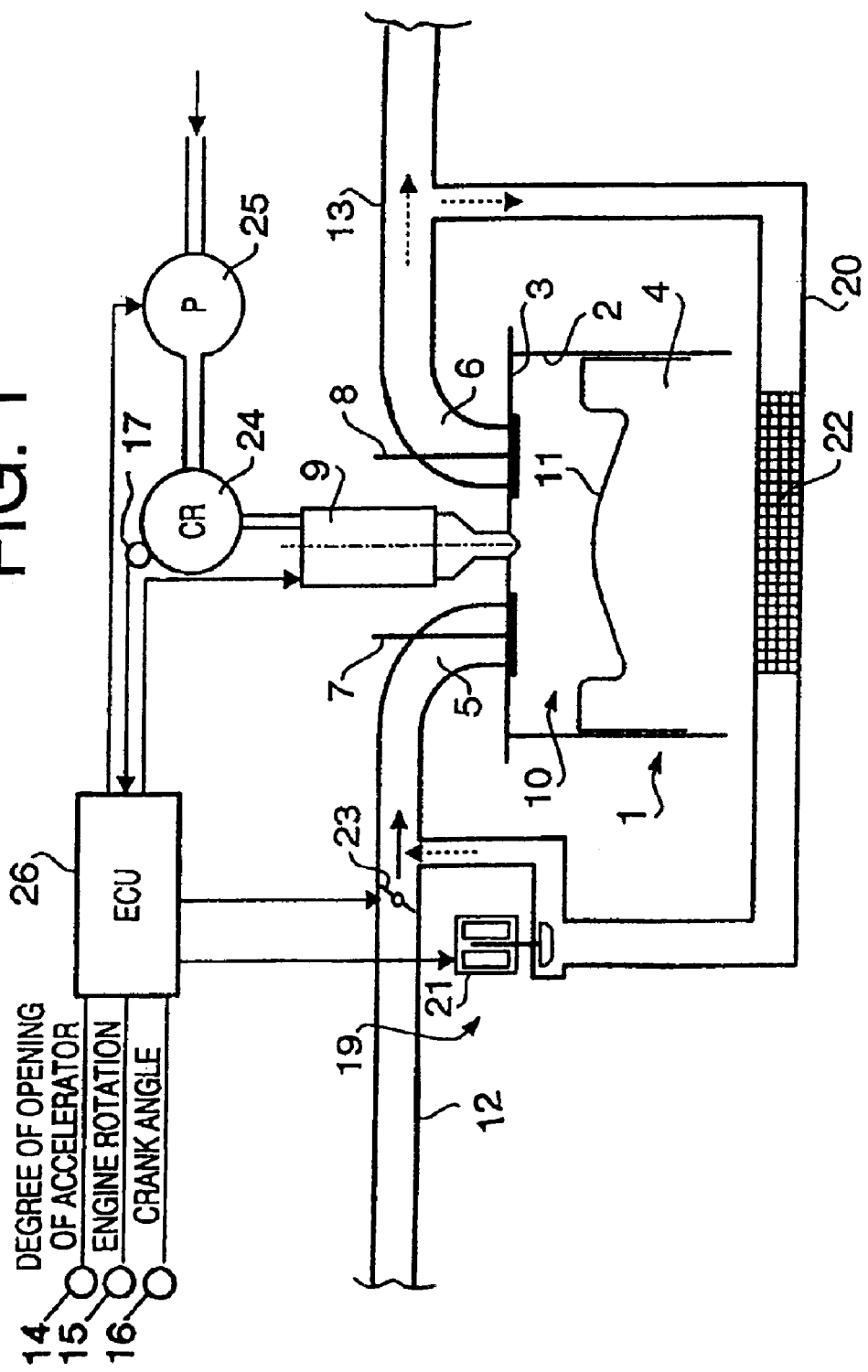
FIG. 1 is a schematic view of a direct-injection diesel engine of a common rail type, equipped with a combustion control device of an embodiment of the present invention.

The preferred embodiment is applied to a direct-injection diesel engine of a common rail type. The schematic configuration thereof will be explained by using FIG. 1. In FIG. 1 only one cylinder is shown, but obviously a multiple cylinder engine may be also employed.

In the figure, the reference numeral 1 stands for an engine body comprising a cylinder 2, a cylinder head 3, a piston 4, an intake port 5, an exhaust port 6, an intake valve 7, an exhaust valve 8, and an injector 9. A combustion chamber 10 is formed in the space between the cylinder 2 and the cylinder head 3. Fuel is directly injected from the injector (fuel injection valve) 9 into the combustion chamber 10. A cavity 11 is formed in the top portion of the piston 4. The cavity 11 constitutes part of the combustion chamber. The cavity 11 provides a combustion chamber of a reentrant type with a bulging center of the bottom portion. The injector 9 is disposed almost coaxially with the cylinder 2, and fuel is injected radially and simultaneously from a plurality of injection holes. The injector 9 is connected to a common rail 24, and a high-pressure fuel stored in the common rail 24 is constantly supplied to the injector 9. Pumping of fuel into the common rail 24 is conducted with a high-pressure supply pump 25.

The intake port 5 is connected to an intake pipe 12, and the exhaust port 6 is connected to the exhaust pipe 13.

The engine of this embodiment employs an EGR unit (exhaust gas recirculation system) 19 for circulating exhaust gas into the combustion chamber 10. The EGR unit 19 comprises an EGR pipe 20 linking the intake pipe 12 and the exhaust pipe 13, an EGR valve 21 for adjusting the EGR ratio, and an EGR cooler 22 for cooling the EGR gas upstream of the EGR valve 21. An intake throttle valve 23 for appropriately throttling the intake is provided in the intake pipe 12 upstream of the joint with the EGR pipe 20.

An electronic control unit (abbreviated hereinbelow as ECU) 26 is provided for electronic control of the engine. The ECU 26 detects the actual engine operation state with a plurality of sensors and controls the injector 9, EGR valve 21, intake throttle valve 23, and a metering valve (not shown in the figures) for adjusting the fuel pumping quantity from the high-pressure supply pump 25 based on the engine operation state. Examples of the aforesaid sensors include an accelerator opening degree sensor 14 for detecting the accelerator opening degree, an engine revolution speed sensor 15 for deterring the revolution speed of the engine, a crank angle sensor 16 for detecting the angle of the crank shaft (not shown in the figures) of the engine, and a common rail pressure sensor 17 for deterring the fuel pressure in the common rail 24. The actual accelerator opening degree, engine revolution speed, crank angle, and common rail pressure are input in the ECU 26.

The injector 9 comprises an electromagnetic solenoid acting as an electric actuator that is switched ON/OFF by the ECU 26. When the electromagnetic solenoid is in an open state realized when it is switched ON, the injector injects the fuel, and when the electromagnetic solenoid is in a closed state realized when it is switched OFF, the injector stops injecting the fuel. The ECU 26 determines the fuel injection quantity and fuel injection period (timing) mainly from the engine revolution speed and acceleration opening degree and switches the electromagnetic solenoid ON/OFF accordingly. The larger is the fuel injection quantity, the longer is the ON time of the electromagnetic solenoid.

The essence of the present invention is in a fuel control device which is capable of realizing a premix combustion that can sufficiently decrease the quantity of NOx and smoke in a wider operation region. The fuel control device of the present embodiment will be described below.

The fuel control device mainly comprises an injector 9, the below-described ignition timing adjusting means for adjusting the ignition timing of a mixture inside a combustion chamber 10 and an ECU (control means) 26 for controlling the fuel injection quantity and fuel injection timing of the injector 9 and ignition timing adjusting means. A specific feature of the fuel injection method realized with this fuel control device is that the injection for premix combustion is separated into a plurality of stages (two stages in the present embodiment). In the present specification, this injection method will be called a multistage premix injection.

More specifically, the ECU (control means) 26 controls the injector (fuel injection valve) 9 so that it conducts the first injection within the interval from the intake stroke to the compression stroke and a second injection conducted with a fuel quantity less than that of the first injection in the vicinity of the compression top dead center after the first injection, and controls the ignition timing adjustment means so that the mixture formed by the fuel injected by the first injection and second injection and the intake air or the like is ignited after the injection of the second injection is completed. The first injection is conducted with the same object as the premix combustion implemented by the conventional single-stage injection as described in Patent References 1 and 2 and simultaneously decreases the quantity of NOx and smoke by enhancing the transition to a lean mixture and homogenization. The second injection is conducted to ensure the ignition of the mixture, thereby enabling the application in a wider operation range.

Furthermore, the multistage premix injection of the present embodiments differs from the two-stage injection described in the aforesaid Japanese Patent Applications Laid-open Nos. 2000-145507 and 2001-207890 in that the fuel injected by the second injection is also subjected to the premix combustion. In other words, because the ignition is started after the completion of the second injection, the fuel injected by the second injection is also leaned and homogenized to a certain degree. Therefore, the quantity of emitted NOx and smoke can be reduced. Furthermore, because the fuel is leaned and homogenized and the ignition is ensured by the second injection, the EGR ratio of the EGR unit 19 can be increased. Therefore, the quantity of emitted NOx can be additionally decreased by increasing the EGR ratio.

In the present embodiment, a map is stored in advance in the ECU 26, this map determining the total fuel injection quantity for each engine operation state (accelerator opening degree, engine revolution speed, and the like), the ratio of the injection quantity of the first injection and second injection in the total fuel injection quantity, and the injection timing of the first injection and second injection, and the ECU 26 determines the injection quantity and injection timing of the first injection and second injection from the map based on the actual accelerator opening degree, engine revolution speed, and the like, that were detected by the accelerator opening degree sensor 14 and the engine revolution sensor 15 and switches ON/OFF the electromagnetic solenoid of the injector 9.

The ratio of injection quantity of the first injection and second injection differs depending on the engine operation state, but the injection quantity of the second injection is basically set rather low by comparison with the injection quantity of the first injection. This is done to prevent completely the misfire in the second injection. However, the ratio of the injection quantity of the second injection is increased when a high output of the engine is required, for example, as at the time of a high load.

In the present embodiment, an EGR device (exhaust gas recirculation system) 19 is used as ignition timing adjustment means. In other words, increasing the EGR ratio, decreasing the concentration of oxygen and compression end temperature of the mixture, and extending the ignition delay period are the adjustments resulting in the mixture being ignited after the completion of the second injection. The EGR ratio necessary to ignite the mixture after the completion of the second injection is determined for each engine operation state by advance testing or simulation and stored in the ECU 26. Thus, the EGR device 19 of the present embodiment has a function of decreasing the quantity of NOx and a function of adjusting the ignition timing.

Figure 2:
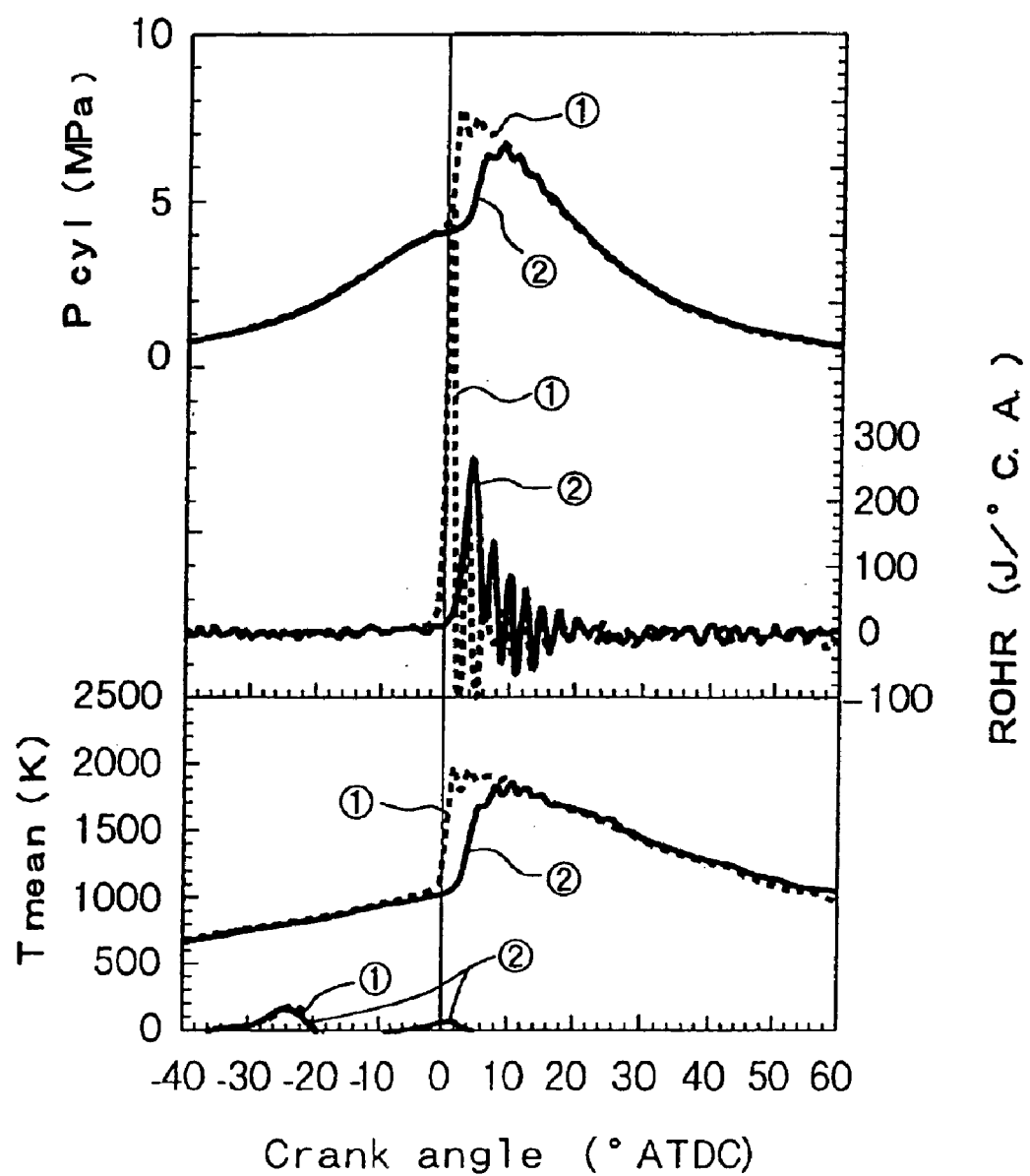
FIG. 2 is a graph showing the measurement results relating to a mean gas temperature in cylinder, heat generation ratio, and pressure in a cylinder obtained when a single-stage premix injection was conducted and a two-stage premix injection was conducted without adjusting the ignition timing.
Figure 3:
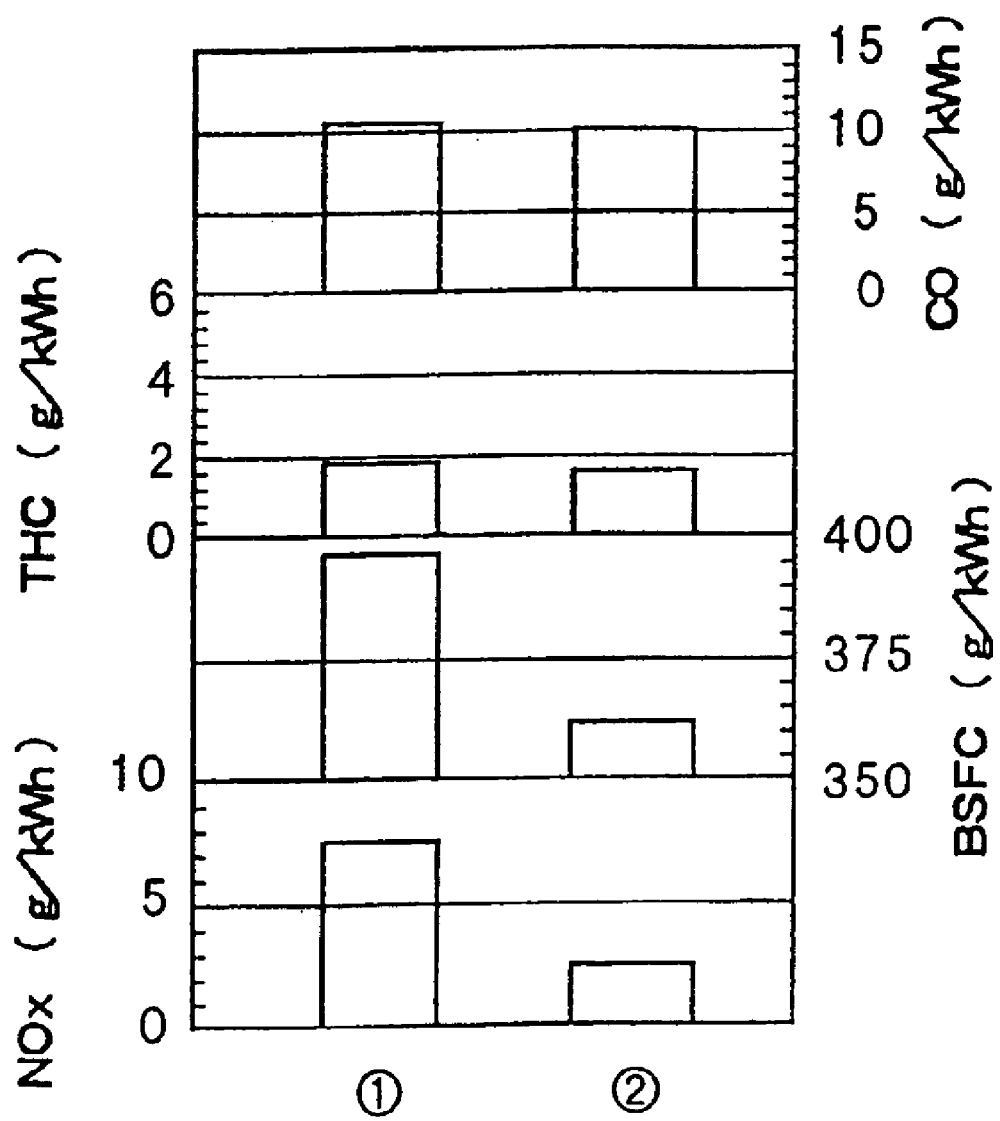
FIG. 3 is a graph showing the measurement results relating to emitted quantities of NOx, THC, and CO obtained when a single-stage premix injection was conducted and a two-stage premix injection was conducted without adjusting the ignition timing.

FIG. 2 shows the measurement results relating to a mean gas temperature in cylinder, Tmean (K), heat generation ratio, ROHR (Rate of Heat Release) (J/° C.A.), and pressure in a cylinder, Pcyl (MPa), obtained when a single-stage premix injection was conducted as described in the aforesaid Japanese Patent Applications Laid-open Nos. H9-112325 and H10-331690 and when a multistage (two-stage) premix injection was conducted. Further, FIG. 3 shows the measurement results relating to the emitted quantities, (g/kWh), of NOx, THC (total Hc or Total HydroCarbon), and CO (Carbon Monoxide) and fuel consumption ratio, BSFC (Break Specific Fuel Consumption) (g/kWh), obtained in the same modes.

Dot lines ① in the figures show the measurement results obtained with the single-stage premix injection; the injection timing was −30° ATDC.

Furthermore, dot lines ② in the figures show the measurement results obtained with the two-stage premix injection; the injection timing of the first injection was about −30° ATDC (After Top Dead Center) and that of the second injection was about TDC (0° ATDC). Furthermore, the injection quantity of the first injection was set to 85% (28 mm³/st) of the total injection quantity, and the injection quantity of the second injection was set to remaining 15% (5 mm³/st). In the test, the adjustment of ignition timing with the EGR device 19 was not conducted.

As follows from the figures, in the case of single-stage premix injection ①, the heat generation ratio ROHR is higher and the combustion period is shorter than those of the two-stage premix injection ②. In other words, it is clear that the combustion is conducted rapidly. For this reason, the quantity of emitted NOx is higher and the diesel knock is intensive.

By contrast, in the case of two-stage premix injection ②, the heat generation ratio ROHR is lower and the combustion period is longer than those of the single-stage premix injection ①. Therefore, the emitted quantity of NOx is limited to about ⅓ that of the single-stage premix injection ①. Furthermore, the diesel knock is also reduced allowing for steady operation. The emitted quantity of NOx is decreased apparently because the gradually proceeding combustion limits the highest temperature inside cylinders. Furthermore, the diesel knock is apparently reduced because the injection quantity of the first injection is less than the injection quantity of the single-stage premix injection ① and the second injection restricts the combustion rate.

Furthermore, in the two-stage premix injection ②, the fuel combustion ratio BSFC was also greatly improved by comparison with that of the single-stage premix injection ① and the quantity of emitted CO and THC was also somewhat reduced.

In the present test, no significant difference was observed between the single-stage premix injection and two-stage premix injection.

The inventors have also conducted a similar test by adjusting the ignition timing with the EGR unit 19 so that the mixture is ignited after the completion of second injection.

Figure 4:
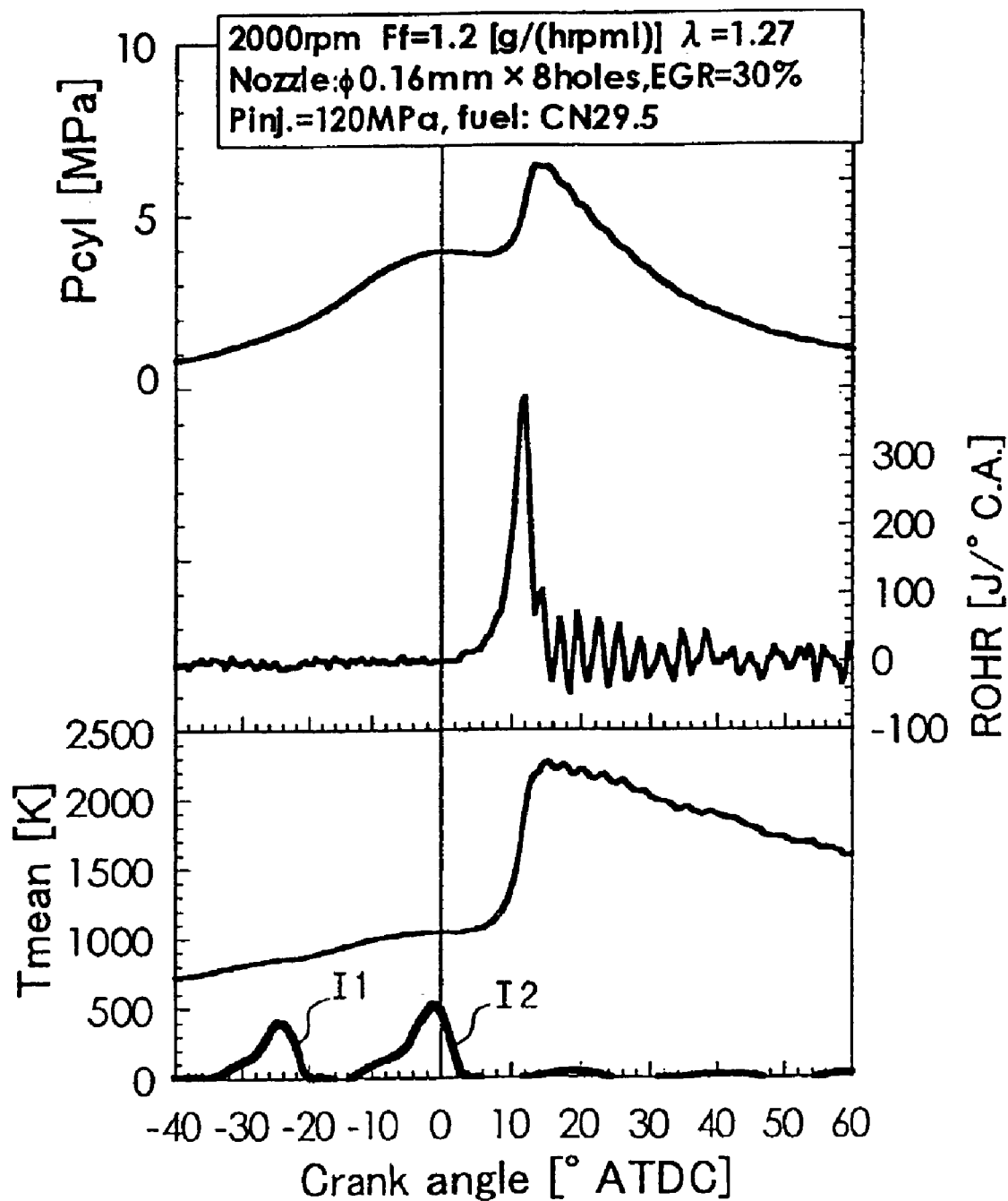
FIG. 4 is a graph showing the measurement results relating to a mean gas temperature in cylinder, heat generation ratio, and pressure in a cylinder obtained when a two-stage premix injection was conducted with the adjustment of the ignition timing.

The results obtained are shown in FIG. 4.

The total fuel injection quantity was selected as a quantity equivalent to the total load of the tested engine, the EGR ratio was set to 30%, and the actual λ (excess air factor) was set to 1.27. The first injection I1 was conduced at about −25° ATDC, and the second injection I2 was conducted close to TDC (0° ATDC). Further, because in this test the operation corresponded to a full load, the injection quantity of the first injection I1 was somewhat larger than the injection quantity of the second injection I2.

As follows from the figures, the second injection I2 ends at about 4° ATDC and then the mean gas temperature in cylinders Tmean, gas generation ratio ROHR, and pressure inside cylinders Pcyl increase at 8–10° ATDC. In other words, it is clear that ignition and combustion start rapidly after the completion of second injection I2.

The concentration of smoke in exhaust gases obtained when the ignition timing was thus adjusted was 0.88 (FSN) (Filter Smoke Number), and this value was sufficiently small by comparison with that obtained with the single-stage premix injection ① and the two-stage premix injection ② in which no adjustment of ignition timing was conducted, those results being shown in FIG. 2. In other words, it was confirmed that smoke could be reduced by conducting premix combustion of the second injection I2. Furthermore, it was also found that the emitted quantities of NOx, CO. and THC were also further reduced by comparison with two-stage premix injection ② in which no adjustment of ignition timing was conducted (those results are shown in FIG. 2).

Accordingly, the inventors have conducted a variety of tests in order to obtain an optimum ignition timing allowing the quantity of smoke to be further reduced or zeroed.

As a result, it was found that the relation shown in FIG. 5 is valid between the smoke formation and the mixture concentration frequency distribution in the combustion chamber 10 at the time the ignition is started.

Figure 5A:
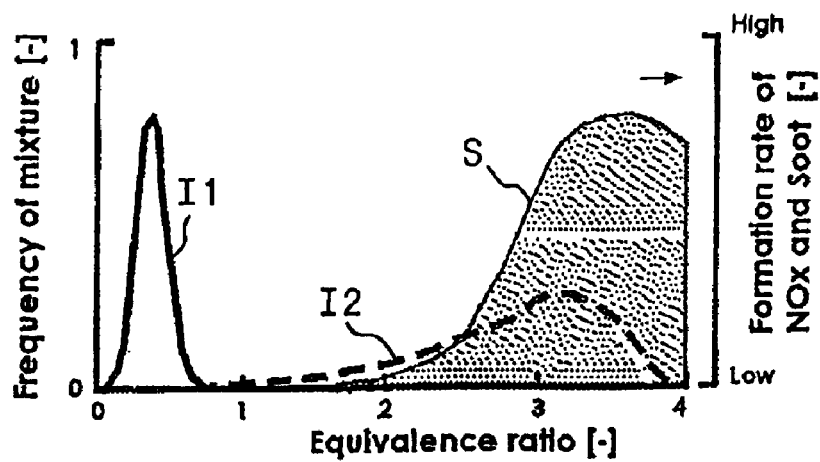
FIG. 5a is a graph illustrating the relation between the mixture concentration frequency distribution and the smoke formation ratio; a case is shown in which a large quantity of smoke is emitted.
Figure 5B:
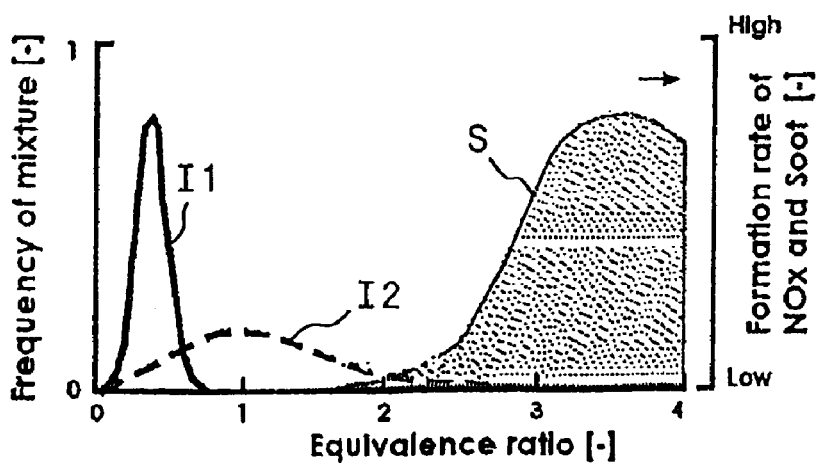
FIG. 5b is a graph illustrating the relation between the mixture concentration frequency distribution and the smoke formation ratio; a case is shown in which no smoke is emitted.

In FIG. 5a and FIG. 5b, the local equivalence ratio of the mixture is plotted against the abscissa, the frequency is plotted against the left ordinate, and the smoke formation ratio is plotted against the right ordinate.

Here, the equivalence ratio is represented by (theoretic air-to-fuel ratio)/(supplied air-to-fuel ratio), and the higher is the value of the equivalence ratio, the higher is the fuel concentration. The mixture concentration frequency distribution represents a spread in the mixture concentration. Line I1 shows the concentration frequency distribution of the mixture formed by the first injection, and line I2 shows the concentration frequency distribution of the mixture formed by the second injection.

The line I1 in FIG. 5a will be described as an example of the mixture concentration frequency distribution. Line A has a peak-like shape with a greatly protruding portion with an equivalence ratio of about 0.4. It means that the large portion of mixing ratio is the concentration with an equivalence ratio of about 0.4 and that a rather uniform mixing ratio was obtained. Furthermore, because the equivalence ratio of the peak (in order words, the peak apex) of the mixture concentration frequency distribution is about 0.4, it is clear that the mixture is rather leaned.

Line S represents a ratio of smoke formation; thus, the smoke is formed if the mixture is present with an equivalence ratio (not less than about 2) positioned in the region on the inner side of line S.

FIG. 5a illustrates the case in which the ignition timing of the mixture was fast and smoke was formed. In other words, the fuel injected by the second injection I2 has not yet been sufficiently leaned and homogenized, and the peak of the mixture concentration frequency distribution of the mixture formed by the second injection I2 is about 3.2. Therefore, smoke is generated.

FIG. 5b illustrates the case in which the ignition timing of the mixture was appropriate and practically no smoke was formed. In this case, the fuel injected by the second injection I2 was sufficiently leaned and homogenized, and the peak of the mixture concentration frequency distribution of the mixture formed by the second injection I2 is about 1.0. Therefore, a large portion of the mixture is outside the region (equivalence ratio is not less than 2) in which smoke is formed. Therefore, no smoke is generated.

It was thus understood that the formation of smoke can be effectively prevented by adjusting the ignition timing with the EGR unit 19 so that the peak of the mixture concentration frequency distribution of the mixture formed by the second injection during the ignition of the mixture present in the combustion chamber 10 becomes less (in other words, not more than 2) than the equivalence ratio at which smoke is formed.

In other words, it is preferred that the ignition timing be adjusted so that the mixture formed by the second injection I2 has a portion with a concentration sufficiently high to enable ignition, but has no portions with a concentration high enough to produce smoke.

Furthermore, it was also understood that in order to lean and homogenize the fuel of the first injection in an optimum manner and thereby effectively reduce the quantity of NOx and smoke, it is preferred that the fuel injection quantity and/or fuel injection timing of the injector 9 be adjusted so that the peak of the mixture concentration frequency distribution of the mixture formed by the first injection during the ignition of the mixture present in the combustion chamber 10 becomes not more than the equivalence ratio of 1.

Figure 6:
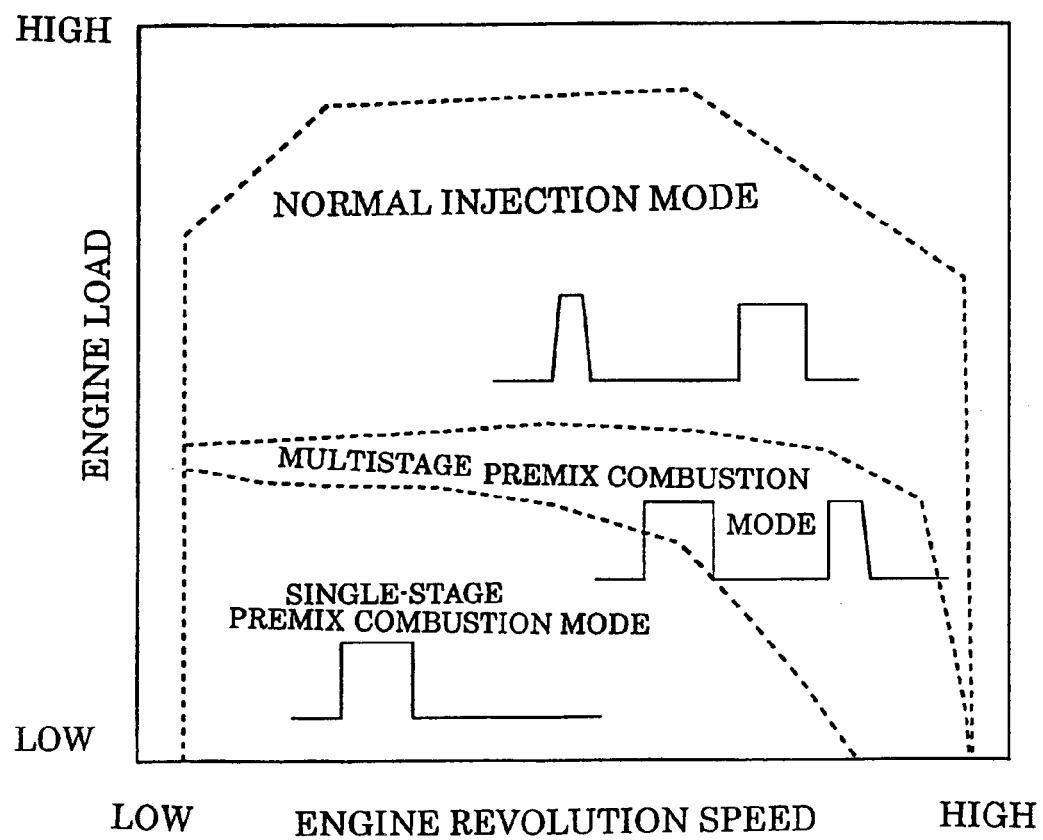
FIG. 6 is a graph illustrating the relation between the engine operation state and fuel ignition mode in the fuel injection control device of the embodiment of the present invention.

Switching of the fuel injection mode dependent on the engine operation state, which is executed by the ECU 26 of the present embodiment, will be described below by using FIG. 6.

The ECU 26 of the present embodiment comprises three modes as fuel injection modes.

The first mode is a single-stage premix injection mode described in Japanese Patent Application laid-open No. H9-112325. In other words, this is the mode in which the injector 9 is controlled so as to execute one injection within the interval from the intake stroke to the compression stroke. It is executed when the engine operation mode is in a region with a comparatively low revolution speed and a low load.

The second mode is a multistage (two-stage) premix injection mode representing a specific feature of the present invention. In this mode, the injector 9 is controlled so as to execute the first injection conducted within the interval from the intake stroke to the compression stroke and the second injection conducted close to the compression top dead center after the execution of the first injection, and the EGR unit 19 is controlled so that the mixture formed by the intake air and the fuel injected by the first injection and the second injection is ignited after the completion of the second injection. This mode is executed when the engine operation conditions are in a region with a revolution speed and load higher than those of the region in which the single-stage premix injection mode is executed.

The third mode is a normal injection mode such as described in Japanese Patent Applications Laid-open Nos. 2000-145507 and 2001-207890. In this mode, the injector 9 is controlled so as to execute a small-quantity pilot injection conducted within an interval from the intake stroke to the compression stroke and the main injection conducted close to the compression top dead center. This mode is mainly executed when the engine operation state is in a region with a load higher than that of the region in which the multistage premix injection mode is executed.

Thus, with the fuel control device of the present embodiment, it is possible to replace part of the region in which the engine conventionally operated in the normal injection mode with the multistage premix injection mode. As a result, the region in which the premix combustion is conducted can be expanded.

The transition from the multistage premix injection mode to the normal injection mode is conducted in the manner as follows.

Thus, the ECU 26 controls the injector 9 so that the injection quantity of the first injection is gradually decreased and the injection quantity of the second injection is gradually increased up to the target injection quantity of the normal injection mode. Furthermore, the EGR unit (exhaust gas recirculation system) 19 is controlled so as to reduce gradually the return ratio (EGR ratio) of the exhaust gas according to the increase in the injection quantity of the second injection. This is done because smoke is produced if the EGR ratio is increased in the normal injection mode, as was mentioned hereinabove.

The present invention is not limited to the above-described embodiment, and various modification thereof can be considered.

For example, the ignition timing adjustment means is not limited to the EGR device presented in the embodiment, and the so-called internal EGR may be used in which no EGR pipe 20 is employed and the exhaust gas is caused to remain inside the cylinder, for example, by opening the exhaust valve in the intake stroke and a variety of EGR units using already combusted gases can be also used. Furthermore, a variety of devices other than EGR units can be also employed.

For example, a variable compression ratio mechanism for changing the compression ratio by varying the capacity of the combustion chamber or a variable valve timing mechanism for changing the compression ratio by varying the open/close timing of the intake and exhaust valves can be used as ignition timing adjustment means. More specifically, the ignition timing can be adjusted to an optimum timing by decreasing the compression ratio and extending the ignition delay period. A specific example of the variable compression ratio mechanism is described in Japanese Patent Application Laid-open No 2001-20784, and a specific example of the variable valve timing mechanism is described in Japanese Patent Application Laid-open No 2000-130200.

Furthermore, injection means in which the mixture temperature is reduced and the ignition delay period is extended by injecting a liquid such as water or alcohol into the mixture in the combustion chamber can be also employed as ignition timing adjustment means.

Further, means which comprises a spark plug provided so as to face the inside of the combustion chamber and current conduction means for igniting the mixture inside the combustion chamber by supplying an electric current to the spark plug and induces ignition of the mixture by supplying an electric current to the spark plug at the optimum timing (after completion of second injection) can be also employed as ignition timing adjustment means.

Further, ignition timing adjustment means may also use a combination of the above-described means.

In the above-described embodiment, an example was considered in which three modes were provided as fuel injection modes. However, the present invention also can cover the entire operation range of the engine with the multistage premix injection mode.

Moreover, the multistage premix injection mode is not limited to two-stage injection, and premix injection comprising three or more stages can be also considered.

Essentially, the present invention produces the following excellent effects.

① Because second injection is executed close to the compression top dead center, ignition at a time of high speed can be enabled and a premix combustion can be conducted within a wider operation rage.

② Because the fuel injected by the second injection is also premix combusted, the quantity of emitted NOx and smoke can be reduced.

③ Because the EGR ratio can be raised, the quantity of emitted NOx can be additionally reduced.

④ Fuel consumption is not degraded and cost is not raised.

The fuel injection quantity control device described and disclosed in the present specification, claims, and accompanying drawings has been described in Japanese Patent Application No. 2003-30811.

What is claimed is:

1. A combustion control method for an engine, comprising the steps of:
    executing at least a first injection which is conducted within the interval from an intake stroke to a compression stroke and a second injection conducted in the vicinity of a compression top dead center after the execution of said first injection; and
    adjusting an ignition timing of a mixture so that the mixture formed by a fuel injected by said first injection and second injection and an intake air or the like is ignited after completion of the injection of said second injection.

2. The combustion control method for an engine according to claim 1, wherein the ignition timing of said mixture is adjusted by adjusting the quantity of exhaust gas returned into the combustion chamber.

3. The combustion control method for an engine according to claim 1, wherein the ignition timing of said mixture is adjusted by changing the capacity of the combustion chamber.

4. The combustion control method for an engine according to claim 1, wherein the ignition timing of said mixture is adjusted by varying the open-close timing of intake and exhaust valves and changing a compression ratio.

5. The combustion control method for an engine according to claim 1, wherein the ignition timing of said mixture is adjusted by injecting a liquid such as water or alcohol into said combustion chamber.

6. The combustion control method for an engine according to claim 1, wherein the ignition timing of said mixture is adjusted by adjusting a current-supplying timing to a spark plug provided so as to face the inside of the combustion chamber.

7. A combustion control device for an engine, comprising a fuel injection valve for injecting a fuel into a combustion chamber, ignition timing adjustment means for adjusting an ignition timing of a mixture inside the combustion chamber, and control means for controlling said fuel injection valve and said ignition timing adjustment means, wherein
    said control means controls said fuel injection valve so as to execute at least a first injection which is conducted within the interval from an intake stroke to a compression stroke and a second injection conducted in the vicinity of a compression top dead center after the execution of said first injection, and controls said ignition timing adjustment means so that the mixture formed by a fuel injected by said first injection and second injection and an intake air or the like is ignited after completion of the injection of said second injection.

8. The combustion control device for an engine according to claim 1, wherein said ignition timing adjustment means comprises exhaust gas recirculation system for circulating exhaust gas into said combustion chamber.

9. The combustion control device for an engine according to claim 7, wherein said ignition timing adjustment means comprises a variable compression ratio mechanism for changing a compression ratio by varying the capacity of said combustion chamber.

10. The combustion control device for an engine according to claim 7, wherein said ignition timing adjustment means comprises a variable valve timing mechanism for changing the compression ratio by varying the open-close timing of intake and exhaust valves.

11. The combustion control device for an engine according to claim 7, wherein said ignition timing adjustment means comprises injection means for injecting a liquid such as water or alcohol into said combustion chamber.

12. The combustion control device for an engine according to claim 7, wherein said ignition timing adjustment means comprises a spark plug provided so as to face the inside of the combustion chamber and current conduction means for igniting the mixture inside the combustion chamber by supplying an electric current to said spark plug.

13. The combustion control device for an engine according to claim 7, wherein said control means controls said ignition timing adjustment means so that the peak of the mixture concentration frequency distribution of the mixture formed by said second ignition when the mixture present inside said combustion chamber is ignited assumes a value of two or less, as an equivalence ratio.

14. The combustion control device for an engine according to claim 7, wherein said control means determines an injection quantity and/or injection timing of said first injection so that the peak of the mixture concentration frequency distribution of the mixture formed by said first ignition when the mixture present inside said combustion chamber is ignited assumes a value of one or less, as an equivalence ratio.

15. A combustion control device for an engine, comprising a fuel injection valve for injecting a fuel into a combustion chamber, ignition timing adjustment means for adjusting an ignition timing of a mixture inside the combustion chamber, and control means for controlling said fuel injection valve and said ignition timing adjustment means, wherein
    said control means comprises as fuel injection modes at least;
    a single-stage premix injection mode in which said fuel injection valve is controlled so as to execute one injection within the interval from an intake stroke to a compression stroke when an engine operation state is in a region with a low revolution speed and a low load; and
    a multistage premix injection mode in which said fuel injection valve is controlled so as to execute at least a first injection conducted within the interval from an intake stroke to a compression stroke and a second injection conducted in the vicinity of a compression top dead center after the execution of said first injection and said ignition timing adjustment means is controlled so that the mixture formed by a fuel injected by said first injection and second injection and an intake air or the like is ignited after the ignition end of said second injection, when the engine operation state is in a region with a higher revolution speed and a higher load than those of the region in which said single-stage premix injection mode is executed.

16. The combustion control device for an engine according to claim 15, wherein said control means additionally comprises as said fuel injection mode a normal injection mode in which said fuel injection valve is controlled so as to execute at least one injection in the vicinity of the compression top dead center when the engine operation state is in a region with a load higher than that of the region in which said multistage premix injection mode is executed.

17. The combustion control device for an engine according to claim 16, wherein said ignition timing adjustment means comprises exhaust gas recirculation system for circulating exhaust gas into said combustion chamber; and said control means controls said fuel injection valve so as to decrease gradually an injection quantity of said first injection of said multistage premix injection mode and to increase gradually an injection quantity of said second injection to a target injection quantity of said normal injection mode, and controls said exhaust gas recirculation system so as to decrease gradually a return ratio of exhaust gas according to the increase in the injection quantity of said second injection when a transition is made from said multistage premix injection mode to said normal injection mode.

18. A combustion control device for an engine according to claim 7, wherein said control means comprises as fuel injection modes at least;

a single-stage premix injection mode in which said fuel injection valve is controlled so as to execute one injection within the interval from an intake stroke to a compression stroke when an engine operation state is in a region with a low revolution speed and a low load; and a multistage premix injection mode in which said fuel injection valve is controlled so as to execute at least a first injection conducted within the interval from an intake stroke to a compression stroke and a second injection conducted in the vicinity of a compression top dead center after the execution of said first injection and said ignition timing adjustment means is controlled so that the mixture formed by a fuel injected by said first injection and second injection and an intake air or the like is ignited after the ignition end of said second injection, when the engine operation state is in a region with a higher revolution speed and a higher load than those of the region in which said single-stage premix injection mode is executed.

19. The combustion control device for an engine according to claim 18, wherein said control means additionally comprises as said fuel injection mode a normal injection mode in which said fuel injection valve is controlled so as to execute at least one injection in the vicinity of the compression top dead center when the engine operation state is in a region with a load higher than that of the region in which said multistage premix injection mode is executed.

20. The combustion control device for an engine according to claim 19, wherein said ignition timing adjustment means comprises exhaust gas recirculation system for circulating exhaust gas into said combustion chamber; and said control means controls said fuel injection valve so as to decrease gradually an injection quantity of said first injection of said multistage premix injection mode and to increase gradually an injection quantity of said second injection to a target injection quantity of said normal injection mode, and controls said exhaust gas recirculation system so as to decrease gradually a return ratio of exhaust gas according to the increase in the injection quantity of said second injection when a transition is made from said multistage premix injection mode to said normal injection mode.

* * * * *